United States Patent [19]
van Deventer

[11] Patent Number: 5,297,223
[45] Date of Patent: Mar. 22, 1994

[54] TRANSMISSION SYSTEMS FOR POLARIZATION-INDEPENDENT TRANSMISSION OF SIGNALS

[75] Inventor: Mattijs O. van Deventer, Leidschendam, Netherlands

[73] Assignee: Koninklijke PTT Nederland N.V., Groningen, Netherlands

[21] Appl. No.: 938,784

[22] Filed: Sep. 1, 1992

[30] Foreign Application Priority Data

Sep. 6, 1991 [NL] Netherlands .................. 9101505
Dec. 20, 1991 [NL] Netherlands .................. 9102159

[51] Int. Cl.$^5$ ........................ G02B 6/26; H04J 14/00
[52] U.S. Cl. ................................... 385/11; 385/15; 385/27; 385/42; 385/44; 359/122; 359/127; 359/156; 359/188; 359/195
[58] Field of Search ................ 385/11, 14, 15, 16, 385/24, 27, 28, 31, 42, 44; 359/122, 127, 152, 154, 156, 180, 188, 190, 192, 195

[56] References Cited

U.S. PATENT DOCUMENTS

| | | | |
|---|---|---|---|
| 4,810,052 | 3/1989 | Fling | 385/24 |
| 5,013,116 | 5/1991 | Yamazaki et al. | 385/15 X |
| 5,023,946 | 6/1991 | Yamazaki et al. | 359/192 X |
| 5,060,312 | 10/1991 | Delavaux | 359/192 |
| 5,069,520 | 12/1991 | Calvani et al. | 385/1 |
| 5,124,828 | 6/1992 | Mahon | 359/192 |
| 5,191,467 | 3/1993 | Kapany et al. | 385/11 X |
| 5,212,710 | 5/1993 | Kaneda et al. | 385/11 X |
| 5,223,975 | 6/1993 | Naganuma et al. | 385/11 X |

FOREIGN PATENT DOCUMENTS

| | | | |
|---|---|---|---|
| 0412543A2 | 2/1991 | European Pat. Off. | 385/15 X |
| 3741284A1 | 6/1989 | Fed. Rep. of Germany | 385/15 X |
| 60-184229 | 9/1985 | Japan | 359/192 X |
| 62-189442 | 8/1987 | Japan | 359/192 X |
| 9002713 | 7/1992 | Netherlands | 385/11 X |
| 2245117 | 12/1991 | United Kingdom | 359/192 X |

OTHER PUBLICATIONS

I. M. I. Habbab et al, "Polarization Switching Techniques for Coherent Optical Communications", Oct. 1988, Journal of Lightwave Technology, pp. 1537-1548.
M. V. Andres et al, "Optical-Fiber Resonant Rings Based on Polarization-Dependent Couplers", Aug. 1990, pp. 1212-1220, Journal of Lightwave Technology.
T. Bricheno et al, "All-Fibre Polarisation Splitter/-Combiner", Mar. 1985, vol. 21, No. 6.

Primary Examiner—Brian Healy
Attorney, Agent, or Firm—Frishauf, Holtz, Goodman & Woodward

[57] ABSTRACT

Transmission system for the polarization-insensitive transmission of signals over a signal route (ST) between a first system connection point (S1) for a transmitter (T) and a second system connection point (S3) for a receiver (R), and between two further system connection points (S2 and S4) for an additional transmitter and a receiver. On one side the high-order retarder (HR) is disposed between the system connection points and the signal route (ST). The system comprises a first and a second hybrid circuit (H1, H2) each provided with two unidirectional connection points and a bidirectional connection point. The unidirectional connection points form the system connection points (S1 to S4 inclusive). The bidirectional connection point of one of the hybrid circuit (H1) is connected via the high-order retarder (HR), and the bidirectional connection point of the other hybrid circuit (H2) is connected directly, to the signal route (ST).

33 Claims, 3 Drawing Sheets

TRANSMISSION SYSTEMS FOR POLARIZATION-INDEPENDENT TRANSMISSION OF SIGNALS

BACKGROUND OF THE INVENTION

The invention relates to transmission systems for the polarisation-insensitive transmission of signals over a signal route.

The article entitled "Polarization-Switching Techniques for Coherent Optical Communications", published in Journal of Lightwave Technology, Volume 6, No. 10, October 1988, pages 1537 to 1548 inclusive, discloses a unidirectional transmission system with polarisation-intensitive transmission of signals over an optical fibre between a transmitter and a receiver.

It is generally known that at the end of an optical waveguide or optical fibre the polarisation state of the light transmitted over the optical waveguide fluctuates. This can be attributed to various causes, such as a mechanically twisted optical fibre, temperature variation, bends in the optical fibres and the like. Because of the varying mismatch between the polarisation of the received signal and the polarisation of the signal from the local oscillator, the sensitivity of the receiver is adversely affected. In the abovementioned article a number of solutions are mentioned for achieving a transmission over an optical fibre which as far as possible is insensitive to the varying polarisation. One of the solutions is the polarisation switching method, using a high-order retarder, in which use is made of a birefringent medium.

From the abovementioned article it is known that a high-order retarder (preferably a birefringent optical fibre) may be provided at the transmission side of a coherent communication system, in order to make this system insensitive to polarisation by applying the principle of "data-induced polarisation switching". When a receiver is shared by a number of transmitters, it would be advantageous to apply said method at the receiver side. However, this method only works if the polarisation of the signal supplied to the high-order retarder is at a fixed angle of approximately 45° relative to the main axis of the high-order retarder. In practice, unfortunately, the signal supplied to the receiver has on the contrary, a strongly fluctuating polarisation, which will consequently produce problems if the high-order retarder is used on the receiver side without further measures being taken.

Dutch Patent Application 9002713 in the name of the Applicant describes a unidirectional transmission system in which the high-order retarder is connected at the receiver side between the optical fibre and the coupling device. This is possible because the angle between one of the main axes of the retarder and the polarisation of the local oscillator is greater than 0° and less than, or equal to, 180° according to the Poincaré representation. Preferably this angle is 90° according to the Poincaré representation. In the case of a linearly polarised signal from the local oscillator and a high-order retarder with linear retardation, this angle of 90° according to the Poincaré representation, corresponds to an angle of 45° between the polarisation axis of the local oscillator and the main axes of the retarder.

SUMMARY OF THE INVENTION

The abovementioned patent application by the Applicant is restricted to the transmission in one direction.

The primary object of the present invention is to provide a transmission system of the type mentioned in the preamble in which transmission in two directions is possible.

This object is achieved, according to the invention by a transmission system for the polarisation-insensitive transmission of signals over a signal route between a first and a second transceiver, each comprising a transmitter and a receiver, the receiver comprising a detector, a local oscillator and a device for coupling the output signal of the oscillator to the detector, is characterised in that a high-order retarder is connected at one side to the signal route and at the other side to a port of a hybrid circuit and in that a transmitter and a receiver, respectively, are connected to the other ports of the hybrid circuit.

For many years it has been common practice to connect the transmission route directly to the bidirectional port of the hybrid circuit and always to place all components of the transmitters and receivers at the unidirectional side of said hybrid circuit. On the basis of this concept, the high-order retarder would be connected to the unidirectional ports of the hybrid circuit. The Applicant has broken with this practice by connecting the high-order retarder between the hybrid circuit and the transmission route. This has the advantage that only one high-order retarder is required per bidirectional path.

In the case of one embodiment of the invention the hybrid circuit is formed by a 3 dB coupling device.

From the "data-induced polarisation switching (DIPS)" principle it is known that a sensitivity loss of 3 dB occurs compared to a system with polarisation control. Furthermore, combining and splitting of the outbound and returning traffic each lead to a loss of 3 dB. Application of the abovementioned principle to bidirectional traffic consequently results in a total loss of 9 dB.

In the case of another embodiment of the invention, the hybrid circuit is formed by a polarisation-splitting coupling device for combining and splitting the outbound and returning traffic. In this way, there is no extra loss for combining and splitting, except for the sensitivity loss of 3 dB, thus achieving a gain of 6 dB compared to the 3 dB coupling device connected as a hybrid circuit.

In the case of the abovementioned embodiment, the local oscillation signal is coupled in by means of a 3 dB coupling device or a polarisation-splitting coupling device. Alternatively, the local oscillation signal can also be supplied to the remaining port of the 3 dB coupling device or polarisation-splitting coupling device, that forms the hybrid circuit.

In the case of other embodiments, part of the transmitted signal is used as local oscillation signal.

In the case of a very simple embodiment, use is made of a self-oscillation mixing receiver connected to the hybrid circuit, a 3 dB coupling device or a polarisation-splitting coupling device.

Since optical hybrid circuit of types such as the polarisation-splitting coupling device and a 3 dB coupling device are completely reciprocal if the light signal propagation direction is reversed, that is to say they always work as splitters in one direction and combiners in the other direction, the idea of the invention is not only applicable to transmission in two directions, but also to transmission over two channels in the same direction. More generally, this idea therefore intends to provide a transmission system of the type mentioned in the preamble, in which system the transmission over two channels in the same direction as well as in mutually opposite directions is possible.

In the case of a transmission system for the polarisation-insensitive transmission of signals over a signal route between a first system connection point for a transmitter and a second system connection point for a receiver, in which transmission system a high-order retarder is disposed between one of the system connection points and the signal route, this object is achieved according to the invention in that the system comprises
- a first hybrid circuit (H) provided with a first unidirectional connection point and a second unidirectional connection point, and a first bidirectional connection point, the first unidirectional connection point forming the first system connection point and the second unidirectional connection point forming a third system connection point,
- a second hybrid circuit switch provided with a first unidirectional connection point and a second unidirectional connection point, and a first bidirectional connection point, the first unidirectional connection point forming the second system connection point and the second unidirectional connection point forming a fourth system connection point,
- the third system connection point and the fourth system connection point being connection points for a transmitter and a receiver or for a receiver and a transmitter, respectively, and the high-order retarder being disposed between the bidirectional connection point of one of the hybrid circuits and the signal route.

BRIEF DESCRIPTIONS OF THE DRAWINGS

The invention will be explained in more detail below by reference to the drawings, in which.

DETAILED DESCRIPTION OF THE INVENTION

Figure 1:
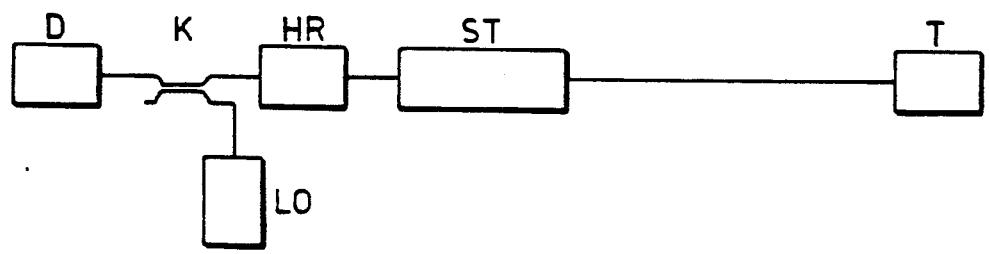
FIG. 1 shows a block diagram of a unidirectional transmission system according to the invention.

Polarised light can always be decomposed into, or built up from, two orthogonally polarised components with or without a phase difference. Light linearly polarised at an angle of 45° can, for example, be made up from a component with horizontal polarisation and a component with vertical polarisation, said components being precisely in phase. In the case of circularly polarised light the components with horizontal and vertical polarisation, respectively, of the electric field are 90° out of phase.

A high-order retarder is based on the concept of retardation. This concept implies that the one component is retarded relative to the other. The retardation may be expressed in degrees. A retardation of 90° converts light polarised linearly at 45° into circularly polarised light. Retardation can also be expressed as a fraction of the wavelength. A retardation of 90° corresponds to a quarter wavelength. A 90° retarder is therefore also sometimes called a λ/4-retarder. As a third possibility, retardation can be defined as delay time. Light of 1500 nm has a period of 5 fs ($5 \cdot 10^{-15}$ sec). A retardation of 90° then corresponds to 1/4·5 fs = 1.25 fs.

The high-order retarder may be regarded as a retarder having a very large retardation. For example, a retardation of 15 cm (500 ps, 100,000, 36,000,000°) may be required. The order of a retarder is the number of times that 360° has to be subtracted from the retardation to obtain a value between −180° and +180°. A retarder with a retardation of 15 cm thus is of the order 100,000. The use of a birefringent fibre of great length as a retarder is known. A typical value of the birefringence of this fibre is $5 \cdot 10^{-4}$, i.e. 0.5 mm retardation per 1 meter of fibre. A retardation of 15 cm therefore requires a birefringent fibre 300 meters in length, causing the high-order retarder to be large in size. Furthermore, birefringent fibres are expensive. Dutch Patent Application 9002713 describes a proposal for a compact and cheap retarder.

The high-order retarder has the property that, if it is supplied with an input signal of pre-determined frequency, an output signal with a defined polarisation direction is produced. If the frequency of the input signal in the abovementioned example of a high-order retarder is higher by 1 GHz, there is produced a signal which has at the output of the retarder a polarisation whose direction is perpendicular to that of the first mentioned output signal, if the polarisation of the light at the input is correctly chosen with regard to the high-order retarder. Switching between the input frequencies therefore achieves switching between the two said polarisation directions. The retarder then operates as a polarisation switch.

The most important use of a retarder with high retardation is the conversion of optical frequency modulation into polarisation modulation, also referred to as "data-induced polarisation switching". Because, if this principle is applied, the frequency is swept over the correct frequency spacing, the polarisation will be switched between two orthogonal states. This is of interest for communication systems that are sensitive to polarisation fluctuations (coherent systems). If all the "zeros" are lost due to an accidental polarisation setting, all the "ones" can still be received and vice versa. It will never be possible for the signal to be lost entirely. If the principle described is applied, however, a sensitivity loss of 3 dB has to be accepted, compared to a more complicated system having polarisation control.

The principle of "data-induced polarisation switching" at the transmitter side is possible, because the transmitter has a known fixed polarisation which can be coupled under the correct angle, preferably 45°, into the high-order retarder.

The costs of said principle consist in particular of the price of the high-order retarder and the fitting of it. Moreover the space occupied by this retarder is of great importance. If a receiver has to be shared by many transmitters, for example in the case of the data traffic of the subscribers to the terminal exchange, it will be advantageous to apply the principle of "data-induced polarisation switching" to the receiver, as the costs associated with the high-order retarder are incurred only once.

However, the desired application appears to be impossible. Said principle of "data-induced polarisation switching" requires, namely, that the polarisation of the signals supplied to the high-order retarder are at an angle of precisely 45° with respect to the main axis of the high-order retarder. Only then can the output polarisations belonging to the states "zero" and "one" be orthogonal.

As has already been mentioned above, the polarisation of the light signal changes arbitrarily as it travels through an optical fibre. The requirement that the polarisation of the transmitter signal must always be at an angle of 45° relative to the main axis of the high-order retarder, cannot therefore be met at the receiver side. It is even possible, that the polarisation is exactly parallel to the main axis of the retarder, as a result of which the polarisation is simply maintained in the high-order retarder, with the "zero" and "one" states emerging from the high-order retarder with the same polarisations. There is then no longer any question of "data-induced polarised switching".

Thus it seems that the application of the principle of "data-induced polarisation switching" to the receiver is not possible because, after the signal has travelled through the optical fibre, the polarisation has changed randomly and moreover varies with time, making it impossible to couple the light at the correct angle into the high-order retarder.

Nevertheless the solution according to Dutch Patent Application 9002713 and shown in FIG. 1, has been found.

The light signal originating from transmitter T is supplied to one input of a coupling device K via a transmission route ST and a high-order retarder HR. The detector D of the receiver is connected to the output of this coupling device K. The signal from the local oscillator LO is supplied to the other input of the coupling device K.

The arrangement shown in FIG. 1 is possible because a particular requirement is met. This requirement is that the polarisation of the light of the local oscillator LO is at 45° relative to the main axis of the high-order retarder HR.

If it is assumed that the polarisation of the received signal is accidentally at an angle of 45° relative to the main axis of the retarder R, the data-induced polarisation switching method then operates in the same way as if the retarder were fitted at the transmitter side. The polarisations of the zeros and ones at the output of the retarder are in this case mutually orthogonal, and if the "zeros" are lost, the "ones" will always remain and vice versa, nor will any of the possible intermediates create any problems.

If the other extreme case in which the received polarisation is exactly parallel to the main axis of the high-order retarder occurs, the polarisations of the "zeros" and "ones" at the output of the high-order retarder will then have remained unchanged and they will still be parallel to the main axis. However, because the polarisation of the output signal of the local oscillator is at an angle of 45° with the main axis of the high-order retarder, the coherent receiver will still receive all "zeros" and "ones", albeit at half power. In terms of sensitivity, this corresponds to loosing all "zeros" and completely receiving all "ones", the sensitivity thus being equal to the case of the high-order retarder being placed next to the transmitter and the "data-induced polarisation switching" method being applied.

In a similar fashion, the signal will never be lost in the case of polarisations at the input of the high-order retarder which lie between the abovementioned extremes, i.e. 45° relative to, or parallel to, the main axis.

To summarise briefly, the principle of data-induced polarisation switching at the receiver side is possible, if the polarisation of the local oscillator is at an angle of 45° relative to the main axis of the high-order retarder.

For the sake of clarity of the explanation, it has been assumed in the above that the polarisation of the local oscillator and of the transmitter, respectively, is at an angle of 45° relative to the main axis of the high-order retarder. It is clear that the invention may be described much more generally by using the Poincaré representation or the Poincaré sphere. According to said representation, the polarisation of the signal from the local oscillator must not coincide with the main axis of the high-order retarder, whilst the main axis of this retarder should preferably be at an angle of 90° to the polarisation of the output signal of the local oscillator, according to the Poincaré representation. A special case of this is a local oscillator with a linearly polarised output signal that is at 45° relative to the main axis of the high-order retarder.

Also, mention has always been made of the main axis of the high-order retarder. As a matter of fact, however, the high-order retarder has two main axes, namely the fast and the slow main axes which are perpendicular to one another. It is therefore preferable to speak of one of the main axes.

According to the invention, the polarisation switching method is applied to two-channel transmission systems, in which the signal transmission in the two channels can either take place in the same or in opposite directions. For many years it has been standard practice to connect the transmission route directly to the bidirectional port of a hybrid circuit, whilst all components of the transmitter and receiver were always placed at the unidirectional ports of the hybrid circuit. On the basis of this practice of many years' standing, the high-order retarder would then also be connected to the bidirectional port of the hybrid circuit in the case of the polarisation-insensitive transmission of signals. The Applicant has broken with this practice by connecting the high-order retarder HR between the hybrid circuit H and the transmission route ST.

Figure 2:
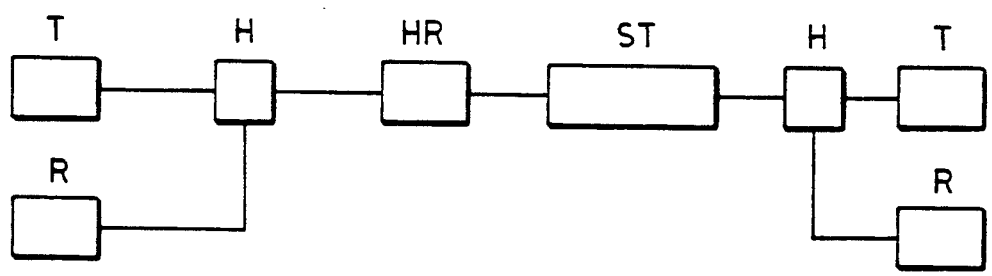
FIG. 2 shows a block diagram of a bidirectional transmission system according to the invention.

This is shown in FIG. 2 for the case of a two-channel system with transmission in two mutually opposite directions. This achieves the advantage that only one high-order retarder per bidirectional path is required. At the unidirectional side of each hybrid circuit H, the transmitter T is connected to one unidirectional port whilst the receiver R, containing a detector, is connected to the other unidirectional port. The local oscillation signal from the local oscillator of the receiver R is coupled into the connection between the unidirectional port of the hybrid circuit and the detector.

In the embodiments shown in FIGS. 3, 4, 5 and 6, the hybrid circuit of FIG. 2 is formed by a coupling device K1, the signal from the local oscillator being coupled in various ways.

A 3 dB coupling device may be chosen as the coupling device for combining and splitting the outbound and returning traffic. Both combining and splitting are subject to a loss of 3 dB. It is also known that a sensitivity loss of 3 dB occurs in the case of the polarisation switching method. Consequently there is a total loss of 9 dB over the outbound and returning direction.

For combining and splitting of the outbound and returning traffic, a polarisation-splitting coupling device can be used instead of the 3 dB coupling device as a hybrid circuit. The advantage of this choice is that, apart from the sensitivity loss of 3 dB, no extra loss occurs in the case of the polarisation switching method. Compared to the 3 dB coupling device, a gain of 6 dB is consequently achieved.

In FIGS. 3, 4, 5 and 6 only the components at one side of the signal route are drawn, since the connection of the components at the other side of the signal route is the mirror image of the one side, with the exception of the high-order retarder at the other side of the signal route. In other words, at the other side a coupling device corresponding to the coupling device K1 is directly connected to the signal route. Any other circuit for the splitting and combining of signals can be used at the other side of the transmission route.

Figure 3:
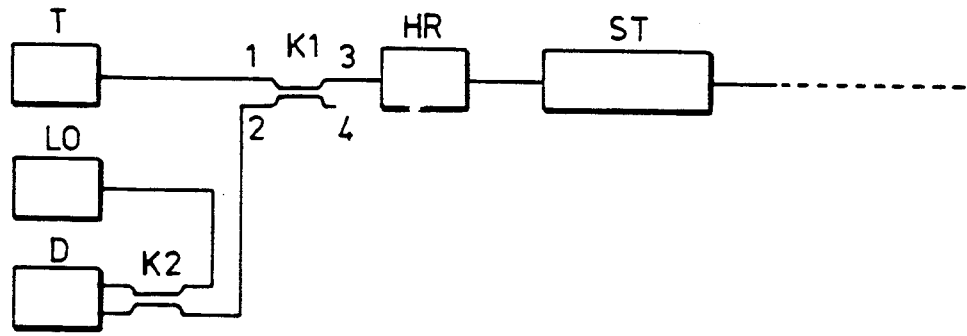
FIG. 3 shows a block diagram of an embodiment, according to the invention, of the transmission system according to FIG. 2.

In the case of the embodiment according to FIG. 3, the transmitter T is connected to a first port of the coupling device K1, whilst the detector D of the receiver is connected to the second port of the coupling device via a second coupling device K2. The local oscillator is connected to the second coupling device K2. Connected to the third port of the coupling device K1 is the high-order retarder whose other end is connected to the signal route ST.

If a 3 dB coupling device is chosen as the coupling device K1, the angle between one of the main axes of the high-order retarder and the polarisation direction of the signal originating from the transmitter T must be between 0° and 180° according to the Poincaré representation. Preferably this angle equals 90° according to the Poincaré representation.

The second port of the 3 dB coupling device K1 is connected to the detector via a second 3 dB coupling device or a polarisation-splitting coupling device K2. The local oscillator LO is connected to the remaining port of the second 3 dB coupling device or polarisation splitting coupling device K2. Because the angle between the polarisation direction of the oscillator signal and one of the main axes of the high-order retarder is between 0° and 180°, according to the Poincaré representation, the result is achieved that the zeros and ones of the received signals will never both be lost. Preferably this angle is 90° according to the Poincaré representation.

If, preferably, a first polarisation-splitting coupling device is used as the coupling device K1, the angle between the main axis of the port 3, connected to the high-order retarder, of this first polarisation-splitting coupling device K1 and the main axis of the retarder must be between 0° and 180° according to the Poincaré representation. In addition, the signal originating from transmitter T must be coupled with a polarisation of 0° or 180° according to the Poincaré representation relative to the main axis of the polarisation splitting coupling device K1, in order to achieve that the transmitted signal can be taken off that port of the polarisation-splitting coupling device K1 to which the high-order retarder is connected. In this case that is port 3. This choice of the polarisation direction therefore depends on which of the ports the retarder and the transmitter are connected to.

Preferably, the angle between the main axis of the port 3, connected to the high-order retarder, of the first polarisation-splitting coupling device K1, and the main axis of the retarder is equal to 90° according to the Poincaré representation.

The second port 2 of the polarisation-splitting coupling device K1 is connected to the detector D via a 3 dB coupling device K2, the local oscillator LO being connected to the remaining port of the 3 dB coupling device K2. The polarisation direction of the signal originating from the local oscillator LO must be equal to that of the received signal originating from the polarisation-splitting coupling device K1 at the port 2 thereof. The polarisation of the received signal is determined by the polarisation-splitting coupling device K1. Specifically, this depends on the received signal in the polarisation-splitting coupling device K1 being a straight-through or a crossover signal.

Figure 4:
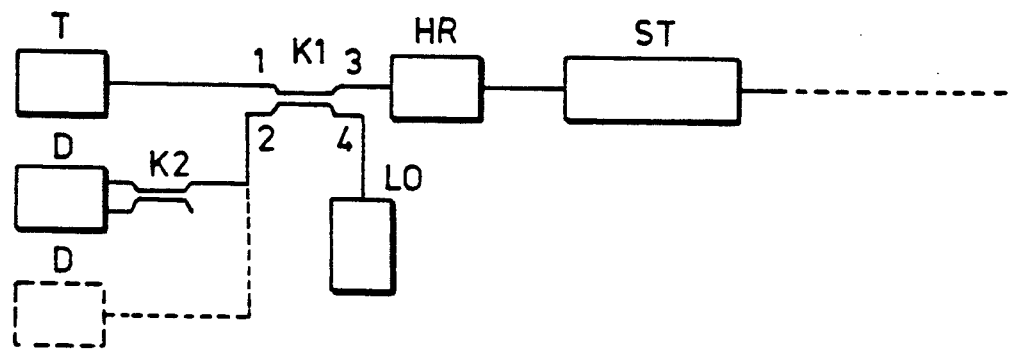
FIG. 4 shows a block diagram of another embodiment, according to the invention, of the transmission system according to FIG. 2.

In the case of the transmission system according to FIG. 4, the transmitter T is connected to a first port 1 of the coupling device K1. The transmitter signal appearing at port 3 of the coupling device K1 is supplied to the transmission route ST via the high-order retarder HR. The received signal originating from the transmission route ST via the high-order retarder is also supplied to port 3 of the coupling device K1 and, depending on the construction of the coupling device K1, appears in its entirety or in part at port 2. This received signal is then supplied via the coupling device K2 to the detector D of the receiver. The local oscillator signal from the local oscillator LO is supplied to port 4 of the coupling device K1.

In the case of this embodiment, too, a 3 dB coupling device or a polarisation-splitting coupling device can be used as the coupling device K1, the latter being preferred because of lower losses.

If a 3 dB coupling device K1 is used, the angle between one of the main axes of the high-order retarder HR and the polarisation direction of the signal originating from the transmitter T must be between 0° and 180° according to the Poincaré representation. Preferably this angle is 90° according to the Poincaré representation. In this embodiment, the coupling device K2 is replaced by a direct through-connection.

The second port of the 3 dB coupling device K1 is directly connected via the through-connection shown as a dotted line to the detector D, also shown in dotted lines. In this case the angle between the polarisation direction of the oscillator signal and one of the main axes of the high-order retarder must be between 0° and 180° according to the Poincaré representation. Preferably this angle is 90° according to the Poincaré representation.

If a polarisation splitting coupling device K1 is chosen as the first coupling device K1, the angle between the main axis of the port connected to the high-order retarder of this polarisation-splitting coupling device K1 and the main axis of the retarder must have a value between 0° and 180°, preferably 90° according to the Poincaré representation. In addition, the signal originating from the transmitter must be coupled with a polarisation of 0° or 180° according to the Poincaré representation, for the same reason as applies to the use of a polarisation-splitting coupling device as the coupling device K1 in FIG. 3. The angle consequently depends on which of the ports the transmitter T and the high-order retarder HR are connected to (straight-through or crossover signal in the polarisation splitting coupling device K1).

In the case of the coupling device K2, a direct through-connection or a polarisation-splitting coupling device K1 may be used, and in the latter case the angle between the main axes of the first and second polarisation splitting coupling device K1 and K2 being between 0° and 180°, respectively, according to the Poincaré representation. Preferably this angle is 90° according to the Poincaré representation. The signal from the local oscillator, LO which is connected to the fourth port of the first polarisation-splitting coupling device K1, must be coupled with a polarisation of 0° or 180° according to the Poincaré representation. This depends on which of the ports at the other side of the polarisation-splitting coupling device K1 the local oscillator LO is connected to. Again this is a matter of straight-through or crossover signal.

Figure 5:
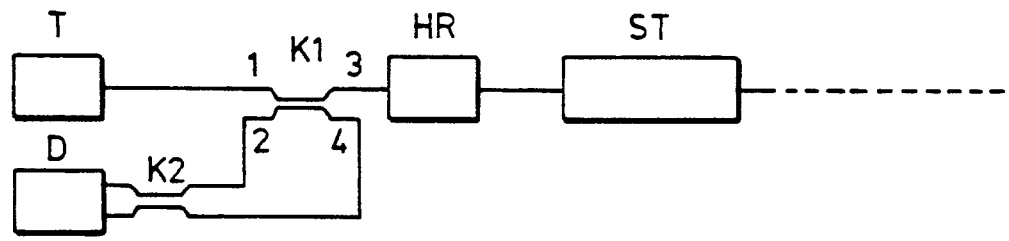
FIG. 5 shows a block diagram of an embodiment, according to the invention, of the transmission system according to FIG. 2, in which part of the transmitter signal is used as a local oscillator signal.

FIG. 5 shows an embodiment in which part of the transmitter signal is used as the local oscillator signal.

The transmitter T is connected to port 1 of the coupling device K1. The transmitter signal appearing at port 3 of the coupling device is supplied to the transmission route ST via the high-order retarder HR. A part of the transmitter signal also appears at port 4 of the coupling device K1 and is coupled by means of the coupling device K2 as a local oscillation signal for the coherent detector D of the receiver. The received signal also passes through the high-order retarder HR and is taken off at port 2 of the coupling device K1 and supplied via coupling device K2 to the detector D.

In the case of the embodiment shown in FIG. 5 too, the chosen coupling device K1 may again be a 3 dB coupling device or a polarisation-splitting coupling device, the latter again being preferable.

If a 3 dB coupling device K1 is used, the angle between one of the main axes of the high-order retarder HR and the polarisation direction of the signal originating from the transmitter T must be between 0° and 180° according to the Poincaré representation, preferably 90°.

A 3 dB coupling device is used as the coupling device K2. In this case, the angle between the transmitter signal used as the local oscillator signal and the received signal is automatically correct.

If a polarisation-splitting coupling device K1 is used as coupling device, the angle between the main axis of the port connected to the high-order retarder HR of the first polarisation-splitting coupling device K1 and the main axis of the retarder HR must be between 0° and 180° according to the Poincaré representation, preferably 90°. Additionally, the signal originating from the transmitter T must be coupled with a polarisation that is not 0° or 180° according to the Poincaré representation, in order to make a part of the signal on the transmitter T appear as a local oscillator signal at port 4 of the coupling device K1. Again this depends on which of the ports the transmitter T and the high-order retarder HR are connected to.

A 3 dB coupling device is used as the second coupling device K2.

Figure 6:
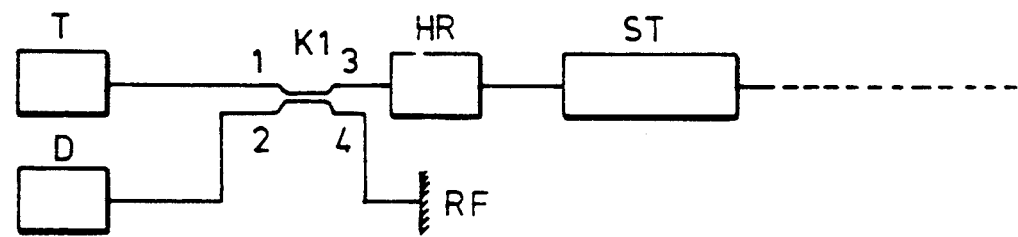
FIG. 6 shows a block diagram of another embodiment according to the invention, in which the local oscillator signal is taken from the transmitter signal.

In FIG. 6 a second embodiment is shown, in which part of the transmitter signal is used as the local oscillator signal.

The transmitter T is connected to port 1 of the 3 dB coupling device K1. The transmitter signal appearing at port 3 of the coupling device K1 is supplied to the transmission route ST via the high-order retarder HR. A part of the transmitter signal is reflected by a reflector RF connected to port 4 of the coupling device K1 and shown diagrammatically. The reflected signal and the signal originating from the transmission route ST is in part supplied via port 2 of the coupling device K1 to detector D.

The angle between one of the main axes of the high-order retarder HR and the polarisation direction of the signal originating from the transmitter T must be between 0° and 180° according to the Poincaré representation, preferably 90° according to this representation.

Figure 7:
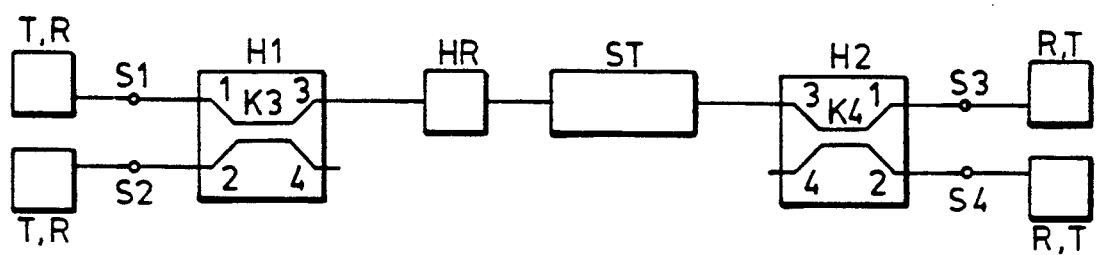
FIG. 7 shows a block diagram of a two-channel transmission system according to the invention.

Instead of incorporating both a transmitter T and a receiver R at each side of the transmission route ST, thereby achieving a signal transmission system in two mutually opposite directions, the essence of the invention, i.e. the insertion of a high-order retarder HR between a hybrid circuit H and the signal route on one side of the signal route, can also be used in a transmission system if both transmitters are on the same side of the signal route and both receivers on the opposite side. This is based on the fact that optical hybrid circuits, such as the polarisation-splitting coupling device and the 3 dB coupling device, will operate completely reciprocally, i.e. the combining of signals in one direction and the splitting of signals in the other direction. A block diagram of such a two-channel system is shown in FIG. 7. Again, the high-order retarder HR is incorporated on one side between the signal route ST and a first hybrid circuit H1. This first hybrid circuit is provided with two connection points S1 and S2. At the other side, a second hybrid circuit H2 is connected to the signal route ST and is also provided with two connection points S3 and S4. Either a transmitter T or a receiver R may be connected to each of the connection points S1, S2, S3 and S4, always with the proviso that in total always two transmitters T and two receivers R are connected. This is shown in the figure by the letter combinations T,R and R,T placed near the small boxes connected to four connection points. In the small boxes representing the hybrid circuits H1 and H2, coupling devices K3 and K4 respectively are shown, each with ports 1, 2, 3 and 4. Ports 1 and 2 of hybrid circuit H1 form the connection points S1 and S2, respectively, and the ports 3 and 4 of hybrid circuit H2 form the connection points S3 and S4, respectively. As each mutually cooperating transmitter/receiver pair operates at its own wavelength, such a two-channel system can function as two physically separate polarisation-insensitive transmission systems, each with a transmitter and a receiver. In this case too, certain conditions must be met, again depending on the type of the coupling device K3—3 dB or polarisation-splitting—chosen for the hybrid circuit H1 connected to the high-order retarder HR. If transmitters are connected to the connection points S1 and S2, then the same conditions apply to each transmitter signal emitted at these connection points as stated above for the transmitter signal emitted by the transmitter in the bidirectional transmission system described on the basis of FIGS. 2 to 6 inclusive. If receivers are connected to connection points S1 and S2, then each of the two receivers must be connected to the coupling device K3 according to one of the methods described above, the receiver being coupled to the coupling device K1 connected to the retarder HR.

If, for example, the coupling device K3 is of the polarisation-splitting type, then, as a minimum requirement, the angle between the main axis of the port 3, connected to the high-order retarder of the polarisation-splitting coupling device K3, and the main axis of the retarder must between 0° and 180° according to the Poincaré representation. If transmitters are connected to the connection points S1 and S2 then the signal originating from the one transmitter connected to connection point S1 should be coupled with a polarisation of 0° and the signal originating from the other transmitter be coupled with a polarisation of 180°, according to the Poincaré representation, relative to the main axis of the polarisation-splitting coupling device K3, in order to achieve the result that each transmitter signal can be taken off at that port of the polarisation-splitting coupling device K3 to which the high-order retarder is connected. In this case that is port 3. Preferably, the angle between the main axis of the port 3, connected to the high-order retarder, of the polarisation-splitting coupling device K3 and the main axis of the retarder is 90° according to the Poincare representation.

If a receiver R is connected to each of the connection points S1 and S2, it is the case that the polarisation of each received signal is determined by the polarisation-splitting coupling device K3. Again it depends on which received signal in the polarisation-splitting coupling device K3 is a straight-through or a crossover signal.

Although the transmitters, receivers, 3 db coupling devices and hybrid circuits, as well as polarisation-splitting coupling devices, and so on, mentioned above, are devices which are commercially available, integrated optical and opto-electronic circuits are now known per se in which the functions of the transmitter and/or local oscillator and/or detector and/or 3 dB coupling device for mixing of signals and/or the polarisation-splitting coupling device are combined in one or more components in such a way that the various functions cannot or virtually not be distinguished physically and cannot be indicated separately. In this context reference is made to:

1) the article entitled "Self-oscillating optical mixer receiver", published in "Optical Fibre Communication Conference, 1989, Technical Digest Series, volume 5, Paper WN4," page 96, dated Feb. 6-9, 1989, Houston, Tex.;
2) the article entitled "Simple in-line bi-directional 1.5 μm/1.3 μm transceivers" published in "IEEE International Semi-conductor Laser Conference", dated Sep. 9-14, 1990, page 166 and 167;
3) the article entitled "Tunable Multiple-Quantum-Well Distributed-Bragg-Reflector Lasers as Tunable Narrow-Band Receivers", published in "Conference on Integrated and Guided Wave Optics Postdeadline Paper PD1, Houston, Tex.", dated Feb. 6-8, 1989, pages PD1-1 to PD1-4 inclusive;
4) the article entitled "1.5 μm Compressive-Strained Multiquantumwell Waveguide Detectors for Coherent Polarisation-Diversified Receivers", published in "Electronics Letters" of May 9, 1991, volume 27, no. 10, pages 838 and 839.

In the case of such circuits too, the polarisation sensitivity of coherent detection is a problem. The polarisation sensitivity can be reduced in the case of said circuits by inserting, according to the invention, a high-order retarder at one side under the correct angle.

The assembly as well as the procurement of a polarisationsplitting coupling device is facilitated by what is described by M. V. Andres and K. W. H. Foults in "Optical-fibre resident rings based on polarisation-dependent couplers", Journal of Lightwave Technology, Aug. 8, 1990 No. 8, pp 1212–1220, in particular Sections B and C and in the article "All-fibre Polarisation splitter-combiner" by T. Bricheno and V. Baker, published in Electronic Letters, Mar. 14, 1985, Vol. 21, No. 6.

In a very simple embodiment, a self-oscillation mixing receiver can be used as receiver, which is connected to the one two-wire side of the hybrid circuit or to one of the ports of a 3 dB coupling device or polarisation-splitting coupling device, which is in turn connected to the signal route ST via a high-order retarder HR. The transmitter T can again be connected in the fashion shown in FIGS. 2, 3, 4, 5 and 6.

I claim:

1. Transmission system for the polarisationinsensitive transmission of signals over a signal route between a first and a second transceiver, each comprising a transmitter (T) and a receiver (R), the receiver comprising a detector (D), a local oscillator (LO) and a device for coupling the output signal of the oscillator to the detector, characterised in that a passive high-order retarder (HR) is connected in series with the signal route (ST) between said signal route and a bidirectional port of a three-port hybrid circuit (H) and in that a said transmitter (T) and a said receiver (R), respectively, are connected to the other ports of the hybrid circuit (H).

2. Transmission system according to claim 1, characterised in that the hybrid circuit (H) is formed by a first polarisation-splitting coupling device (K1), of which a first port (1) is connected at one side to the transmitter (T) and a second port (2) at this side is connected to the detector (D) and of which a third port (3) on the other side is connected to the high-order retarder (HR) in such a way that the angle between the main axis of the port (3), connected to the high-order retarder (HR), of the first polarisation-splitting coupling device (K1), and the main axis of the retarder is between 0° and 180° according to the Poincaré representation and the signal originating from the transmitter (T) is coupled with a polarisation of 0° or 180° according to the Poincaré representation relative to the main axis of the polarisation-splitting coupling device (K1), depending on which of the ports (1 or 2) at the one side the transmitter (T) is connected to.

3. Transmission system according to claim 2, characterised in that the second port (2) of the first polarisation-splitting coupling device (K1) is connected to the detector via a 3 dB coupling device (K2), to which the local oscillator (LO) is connected with a polarisation direction which corresponds to that of the received signal originating from the first polarisation-splitting coupling device.

4. Transmission system according to claim 2, characterised in that the second port (2) at the one side of the first polarisation-splitting coupling device (K1) is connected, either directly or via a second polarisation-splitting coupling device (K2), to the detector (D), the angle between the main axes of the first and second polarisation-splitting coupling devices (K1, K2) being between 0° and 180° according to the Poincaré representation, and in that to the fourth port (4) at the other side of the first polarisation-splitting coupling device (K1) the local oscillator (LO) is connected, whose signal is coupled with a polarisation of 0° or 180° according to the Poincaré representation, depending on which of the ports (3, 4) at the other side of the first polarisation-splitting coupling device (K1) the oscillator (LO) is connected to.

5. Transmission system accoding to claim 4, characterised in that the angle between the main axes of the first and second polarisation-splitting coupling devices (K1, K2) is 90° according to the Poincaré representation.

6. Transmission system according to claim 1, characterised in that the hybrid circuit (H) is formed by a first polarisation-splitting coupling device (K1) of which a first port (1) at the one side is connected to the transmitter (T) and of which a third port (3) at the other side is connected to the high-order retarder (HR), the angle between the main axis of the port (3) connected to the high-order retarder (HR) of the first polarisation-splitting coupling device (K1), and the main axis of the retarder being between 0° and 180° according to the Poincaré representation, and the signal originating from the transmitter is coupled with a polarisation that is not equal to 0° or 180° according to the Poincaré representation, depending on which of the ports (1, 2) at the one side the transmitter (T) is connected to, and in that the second port (2) at the one side and the fourth port (4) at the other side of the first polarisation-splitting coupling device (K1) are connected via a 3 dB coupling device (K1) to the detector.

7. Transmission system according to one of claim 2, characterised in that the angle between the main axis of the port connected to the high-order retarder of the first polarisation-splitting coupling device and the main axis of the retarder is 90° according to Poincaré representation.

8. Transmission system according to claim 3, characterised in that the angle between the main axis of the port connected to the high-order retarder of the first polarisation-splitting coupling device and the main axis of the retarder is 90° according to Poincaré representation.

9. Transmission system according to claim 4, characterised in that the angle between the main axis of the port connected to the high-order retarder of the first polarisation-splitting coupling device and the main axis of the retarder is 90° according to Poincaré representation.

10. Transmission system according to claim 5, characterised in that the angle between the main axis of the port connected to the high-order retarder of the first polarisation-splitting coupling device and the main axis of the retarder is 90° according to Poincaré representation.

11. Transmission system according to claim 6, characterised in that the angle between the main axis of the port connected to the high-order retarder of the first polarisation-splitting coupling device and the main axis of the retarder is 90° according to Poincaré representation.

12. Transmission system according to claim 1, characterised in that the hybrid circuit (H) is formed by a first 3 dB coupling device (K1) of which a first port (1) at the one side is connected to the transmitter (T) and a second port (2) at this side is connected to the detector (D) and of which a third port (3) on the other side is connected to the high-order retarder (HR), the angle between one of the main axes of the high-order retarder and the polarisation direction of the signal originating from the transmitter being between 0° and 180° according to the Poincaré representation.

13. Transmission system according to claim 12, characterised in that the angle between one of the main axes of the high-order retarder and the polarisation direction of the signal originating from the transmitter is 90° according to the Poincaré representation.

14. Transmission system according to claim 12, characterised in that the second port (2) of the first 3 dB coupling device is connected to the detector (D) via a second 3 dB coupling device (K1), to which the local oscillator (LO) is connected, the angle between the polarisation direction of the oscillator signal and one of the main axes of the high-order retarder being between 0° and 180° according to the Poincaré representation.

15. Transmission system according to claim 13, characterised in that the second port (2) of the first 3 dB coupling device is connected to the detector (D) via a second 3 dB coupling device (K1), to which the local oscillator (LO) is connected, the angle between the polarisation direction of the oscillator signal and one of the main axes of the high-order retarder being between 0° and 180° according to the Poincaré representation.

16. Transmission system according to claim 12, characterised in that the second port (2) at the one side of the first 3 dB coupling device (K1) is connected, either directly or via a polarisation-splitting coupling device (K2) to the detector (D), the angle between the main axes of the polarisation-splitting coupling device (K2) and the high-order retarder (HR) being between 0° and 180° according to the Poincaré representation, and in that the local oscillator (LO) is connected to the fourth port (4) on the other side of the first 3 dB coupling device (K1), the angle between the polarisation direction of the oscillator signal and one of the main axes of the high-order retarder being between 0° and 180° according to the Poincaré representation.

17. Transmission system according to claim 13, characterised in that the second port (2) at the one side of the first 3 dB coupling device (K1) is connected, either directly or via a polarisation-splitting coupling device (K2) to the detector (D), the angle between the main axes of the polarisation-splitting coupling device (K2) and the high-order retarder (HR) being between 0° and 180° according to the Poincaré representation, and in that the local oscillator (L0) is connected to the fourth port (4) on the other side of the first 3 dB coupling device (K1), the angle between the polarisation direction of the oscillator signal and one of the main axes of the high-order retarder being between 0° and 180° according to the Poincaré representation.

18. Transmission system according to claim 14, characterised in that the angle between the polarisation direction of the oscillator signal and one of the main axes of the high-order retarder (HR) is 90° according to the Poincaré representation.

19. Transmission system according to claim 15, characterised in that the angle between the polarisation direction of the oscillator signal and one of the main axes of the high-order retarder (HR) is 90° according to the Poincaré representation.

20. Transmission system according to claim 16, characterised in that the angle between the main axes of the polarisation-splitting coupling device (K2) and the high-order retarder (HR) is 90° according to the Poincaré representation.

21. Transmission system according to claim 17, characterised in that the angle between the main axes of the polarisation-splitting coupling device (K2) and the high-order retarder (HR) is 90° according to the Poincaré representation.

22. Transmission system according to claim 12, characterised in that the second port (2) at the one side and the fourth port (4) at the other side of the first 3 dB coupling device (K1) are connected to the detector via a second 3 dB coupling device (K2).

23. Transmission system according to claim 13, characterised in that the second port (2) at the one side and the fourth port (4) at the other side of the first 3 dB coupling device (K1) are connected to the detector via a second 3 dB coupling device (K2).

24. Transmission system according to claim 12, characterised in that the second port (2) of the 3 dB coupling device (K1) is connected directly to the detector (D) and that a reflector (RF) is connected to the fourth port (4) of said coupling device.

25. Transmission system according to claim 13, characterised in that the second port (2) of the 3 dB coupling device (K1) is connected directly to the detector (D) and that a reflector (RF) is connected to the fourth port (4) of said coupling device.

26. Transmission system according to claim 1, 3, 12 or 13, characterised in that the detector is a self-oscillation optical mixing receiver.

27. Transmission system for the polarisation-insensitive transmission of signals over a signal route between a first system connection point for a transmitter and a second system connection point for a receiver, in which transmission system a high-order retarder (HR) is incorporated between one of the system connection points and the signal route (ST), characterised in that the system comprises
 a first hybrid circuit (H1) provided with a first unidirectional connection point and a second unidirectional connection point, and a first bidirectional connection point, the first unidirectional connection point forming the first system connection point (S1) and the second unidirectional connection point forming a third system connection point (S2),
 a second hybrid circuit (H2) provided with a first unidirectional connection point and a second unidirectional connection point, and a first bidirectional connection point, the first unidirectional connection point forming the second system connection point (S3) and the second unidirectional connection point forming a fourth system connection point (S4),
 the third system connection point (S2) and the fourth system connection point (S4) being connection points for a transmitter and a receiver (T, R) or for a receiver and a transmitter (R, T), respectively, and the high-order retarder (HR) being connected to the bidirectional connection point of one of the hybrid circuits (H1 or H2) and the signal route (ST).

28. Transmission system according to claim 27, characterised in that the third system connection point (S2) is a connection point for a receiver and the fourth system connection point (S4) is a connection point for a transmitter.

29. Transmission system according to claim 27, characterised in that the third system connection point (S2) is a connection point for a transmitter and the fourth system connection point (S4) is a connection point for a receiver.

30. Transmission system according to claim 27, characterised in that the high-order retarder (HR) is connected to the bidirectional connection point of the first hybrid circuit (H1).

31. Transmission system according to claim 27, characterised in that the high-order retarder (HR) is connected to the bidirectional connection point of the second hybrid circuit (H2).

32. Transmission system according to one of the claims 27 to 31, characterised in that the hybrid circuit (H1 or H2) whose bidirectional connection point is connected to the high-order retarder (HR) is formed by a polarisation-splitting coupling device (K3 or K4) of which a first port (1) forms the first unidirectional connection point, a second port (2) forms the second unidirectional connection point, and a third port (3) forms the first bidirectional connection point, the angle between the main axis of the third port (3) of the polarisation-splitting coupling device (K3 or K4) connected to the high-order retarder (HR) and the main axis of the retarder being between 0° and 180° according to the Poincaré representation.

33. Transmission system according to one of the claims 27 to 31, characterised in that the hybrid circuit (H1 or H2) whose bidirectional connection point is connected to the high-order retarder (HR), is formed by a 3 dB coupling device (K3 or K4) of which a first port (1) forms the first unidirectional connection point, a second port (2) forms the second unidirectional connection point, and a third port (3) forms the first bidirectional connection point.

* * * * *